(12) United States Patent
Kim (10) Patent No.: US 8,345,320 B2
(45) Date of Patent: Jan. 1, 2013

(54) IMAGE READING DEVICE AND IMAGE FORMING APPARATUS HAVING THE SAME

(75) Inventor: Sin Ae Kim, Suwon-si (KR)

(73) Assignee: Samsung Electronic Co., Ltd., Suwon-si (KR)

( * ) Notice: Subject to any disclaimer, the term of this patent is extended or adjusted under 35 U.S.C. 154(b) by 1269 days.

(21) Appl. No.: 12/118,878

(22) Filed: May 12, 2008

(65) Prior Publication Data

US 2009/0027738 A1    Jan. 29, 2009

(30) Foreign Application Priority Data

Jul. 24, 2007 (KR) .......................... 10-2007-0074165

(51) Int. Cl.
*H04N 1/04* (2006.01)
(52) U.S. Cl. .................... 358/474; 358/496; 358/498
(58) Field of Classification Search .................. None
See application file for complete search history.

(56) References Cited

U.S. PATENT DOCUMENTS

| | | | |
|---|---|---|---|
| 5,610,720 A * | 3/1997 | Fujioka et al. ............... | 358/296 |
| 2004/0190956 A1* | 9/2004 | Senda ............................ | 399/328 |

FOREIGN PATENT DOCUMENTS

| KR | 2004-13444 | | 2/2004 |
|---|---|---|---|
| KR | 2004013444 A | * | 2/2004 |

* cited by examiner

*Primary Examiner* — Thierry Pham
(74) *Attorney, Agent, or Firm* — Stanzione & Kim, LLP (57) ABSTRACT

An image reading device and an image forming apparatus having the same, that can prevent unnecessary wear of components or damage of a document when a simplex scanning operation is carried out. The image reading device includes a first reading unit and a second reading unit. The first reading unit includes a first scan unit to scan a first surface of a document, a first press member mounted while opposing the first scan unit, and a first elastic member to bias the first scan unit or the first press member to closely contact the document with the first scan unit. The second reading unit includes a second scan unit to scan a second surface of the document, a second press member mounted while opposing the second scan unit, and a second elastic member to bias the second scan unit or the second press member to closely contact the document with the second scan unit. The second scan unit and the second press member are separated from each other by a lifting device. The first elastic member to bias the first scan unit or the first press member has an elastic force different from an elastic force of the second elastic member to bias the second scan unit or the second press member.

11 Claims, 7 Drawing Sheets

IMAGE READING DEVICE AND IMAGE FORMING APPARATUS HAVING THE SAME

CROSS-REFERENCE TO RELATED APPLICATIONS

This application claims priority under 35 U.S.C. §119(a) from Korean Patent Application No. 2007-0074165, filed on Jul. 24, 2007 in the Korean Intellectual Property Office, the disclosure of which is incorporated herein in its entirety by reference.

BACKGROUND OF THE INVENTION

1. Field of the Invention

The present general inventive concept relates to an image reading device and an image forming apparatus having the same, and more particularly, to an image reading device and an image forming apparatus having the same to perform duplex (double-sided) scanning.

2. Description of the Related Art

An image forming apparatus is an apparatus that prints an image on a printing medium, e.g., paper, according to an input image signal. An image forming apparatus is classified as a printer, a copying machine, a multi-function printer which has multiple functions of printing, copying and scanning, and the like. Particularly, a multi-function printer performs a printing function of printing an image in response to image information from an external apparatus such as a computer, etc., a reading function of reading image information recorded on a document and retaining the image information in a recording medium, a copying function of printing an image in response to scanned image information, and a fax function of transmitting scanned image information to a remote place through communication links.

In order to achieve the above functions, a multi-function image forming apparatus is equipped with an image reading device which reads image information recorded on a document. An example of a conventional image reading device is disclosed in Korean Patent Laid-Open Publication No. 2004-0013444. The conventional image reading device to perform duplex (double-sided) scanning. The conventional image reading device includes a rear surface reading unit and a front surface reading unit which are sequentially arranged along a document feeding direction. The rear surface reading unit includes a white roller mounted in a document feeding path, and a contact image sensor (CIS) biased to the white roller by a constant elastic force. The rear surface reading unit reads image information recorded on a rear surface of the document passing between the white roller and the CIS. The front surface reading unit reads image information recorded on a front surface of the document through a front surface reading image sensor which is mounted at the rear of the rear surface reading unit. If a user selects a duplex (double-sided) scan mode, both the rear surface reading unit and the front surface reading unit operate so that image information recorded on both the surfaces (front surface and rear surface) of the document is scanned. If a user selects a simplex (single-sided) scan mode, either the rear surface reading unit or the front surface reading unit operates selectively so that image information recorded on only one surface (front surface or rear surface) of the document is scanned.

However, when the above conventional image reading device performs a simplex scan mode to scan image information on one surface (e.g., front surface) of the document, the white roller may be worn or the document may be damaged, because the white roller and the CIS make unnecessary friction with each other when the document passes by the rear surface reading unit. Also, when the document makes friction with the white roller or the image sensor, paper dust is generated, which may cause contamination of the image sensor and deterioration of scan quality, and may further cause contamination of other peripheral components and operational disturbance.

SUMMARY OF THE INVENTION

The present general inventive concept provides an image reading device and an image forming apparatus having the same to prevent unnecessary wear of components or damage of a document when a simplex scanning operation is carried out.

Additional aspects and/or utilities of the present general inventive concept will be set forth in part in the description which follows and, in part, will be obvious from the description, or may be learned by practice of the general inventive concept.

The foregoing and/or other aspects and utilities of the general inventive concept may be achieved by providing an image reading device including a first reading unit including a first scan unit to scan a first surface of a document, a first press member mounted while opposing the first scan unit, and a first elastic member to bias the first scan unit or the first press member to closely contact the document with the first scan unit, and a second reading unit including a second scan unit to scan a second surface of the document, a second press member mounted while opposing the second scan unit, and a second elastic member to bias the second scan unit or the second press member to closely contact the document with the second scan unit. The first elastic member to bias the first scan unit or the first press member has an elastic force different from an elastic force of the second elastic member to bias the second scan unit or the second press member.

The image reading device may further include a lifting device to move the second scan unit or the second press member to separate the second scan unit and the second press member from each other.

The elastic force of the second elastic member may be smaller than the elastic force of the first elastic member.

The image reading device may further include a lifting device to move the first scan unit or the first press member to separate the first scan unit and the first press member from each other.

The foregoing and/or other aspects and utilities of the general inventive concept may also be achieved by providing an image reading device including a first reading unit including a first scan unit to scan a first surface of a document, a second reading unit including a second scan unit to scan a second surface of the document, a press member mounted while opposing the second scan unit to closely contact the document with the second scan unit, and an elastic member to elastically bias the second scan unit toward the press member, and a lifting device to move the second scan unit away from the press member.

The first reading unit may further include a press member mounted while opposing the first scan unit to closely contact the document with the first scan unit, and an elastic member to elastically bias the first scan unit toward the press member of the first reading unit. The elastic member of the first reading unit to bias the first scan unit may have an elastic force different from an elastic force of the elastic member of the second reading unit to bias the second scan unit.

The elastic force of the elastic member of the second reading unit to bias the second scan unit can be smaller than the elastic force of the elastic member of the first reading unit to bias the first scan unit.

The lifting device may include a cam member to rotate between a first position in which the cam member is separated from the second scan unit and a second position in which the cam member pushes up the second scan unit.

When the cam member moves from the first position to the second position, the cam member may compress the elastic member. When the cam member moves from the second position to the first position, the second scan unit may return to an original position by an elastic force of the elastic member.

The foregoing and/or other aspects and utilities of the general inventive concept may also be achieved by providing an image reading device including a document feeding path to feed a document therethrough, a first scan unit to scan a first surface of the document, a second scan unit mounted movably between a first position in which the second scan unit closely contacts the document passing through the document feeding path to scan a second surface of the document and a second position in which the second scan unit is separated from the document passing through the document feeding path, a cam member to press one side of the second scan unit to move the second scan unit from the first position to the second position, and an elastic member to press an other side of the second scan unit to move the second scan unit from the second position to the first position.

The foregoing and/or other aspects and utilities of the general inventive concept may also be achieved by providing an image reading device including a document feeding path to feed a document therethrough, a first scan unit to scan a first surface of the document, a second scan unit to scan a second surface of the document, a press member mounted movably between a first position in which the press member closely contacts the document passing through the document feeding path with the second scan unit and a second position in which the press member is separated from the document passing through the document feeding path, a cam member to press one side of the press member to move the press member from the first position to the second position, and an elastic member to press an other side of the press member to move the press member from the second position to the first position.

The foregoing and/or other aspects and utilities of the general inventive concept may also be achieved by providing an image forming apparatus including a frame, and an image reading device mounted in the frame, and including a first reading unit including a first scan unit to scan a first surface of a document, a first press member mounted while opposing the first scan unit, and a first elastic member to bias the first scan unit or the first press member to closely contact the document with the first scan unit, and a second reading unit including a second scan unit to scan a second surface of the document, a second press member mounted while opposing the second scan unit, and a second elastic member to bias the second scan unit or the second press member to closely contact the document with the second scan unit. The first elastic member to bias the first scan unit or the first press member has an elastic force different from an elastic force of the second elastic member to bias the second scan unit or the second press member.

The foregoing and/or other aspects and utilities of the general inventive concept may also be achieved by providing an image forming apparatus including a frame, and an image reading device including at least one scanning units to scan a respective surface of a printing medium, and a press member mounted opposite the at least one scanning units, wherein the at least one of the scanning units and the press member move away from each other to a separation position corresponding to an image forming mode.

The image forming mode may include a duplex scanning mode.

The foregoing and/or other aspects and utilities of the general inventive concept may also be achieved by providing a scanning method of an image forming apparatus, the method including scanning a surface of a printing medium, and determining whether a simplex scanning mode is selected such that, if not, scanning an other surface of the printing medium, and, if so, moving a scan unit and a press member away from each other to a separation position to prevent the press member from pushing the printing medium toward the scanning unit.

The foregoing and/or other aspects and utilities of the general inventive concept may also be achieved by providing a computer-readable recording medium having embodied thereon a computer program to execute a method, wherein the method includes scanning a surface of a printing medium, and determining whether a simplex scanning mode is selected such that, if not, scanning an other surface of the printing medium, and, if so, moving a scan unit and a press member away from each other to a separation position to prevent the press member from pushing the printing medium toward the scanning unit.

The foregoing and/or other aspects and utilities of the general inventive concept may also be achieved by providing an image forming apparatus including an image reading device having a first reading unit to be stationary with respect to a feeding path of a printing medium to read a first surface of the printing medium, and a second reading unit to be movable with respect to the feeding path of the printing medium to read a second surface of the printing medium.

The first reading unit and the second reading unit may be spaced apart from each other along the feeding path.

The first reading unit and the second reading unit may be disposed opposite to each other with respect to the feeding path.

The first reading unit may read a first surface of the printing medium, and the second reading unit may read a second surface of the printing medium.

The first reading unit may have a first friction with the printing medium, and the second reading unit may have a second friction with the printing medium.

BRIEF DESCRIPTION OF THE DRAWINGS

These and/or other aspects and utilities of the present general inventive concept will become apparent and more readily appreciated from the following description of the embodiments, taken in conjunction with the accompanying drawings, of which.

DETAILED DESCRIPTION OF THE PREFERRED EMBODIMENTS

Reference will now be made in detail to embodiments of the present general inventive concept, examples of which are illustrated in the accompanying drawings, wherein like reference numerals refer to like elements throughout. The embodiments are described below in order to explain the present general inventive concept by referring to the figures.

Figure 1:
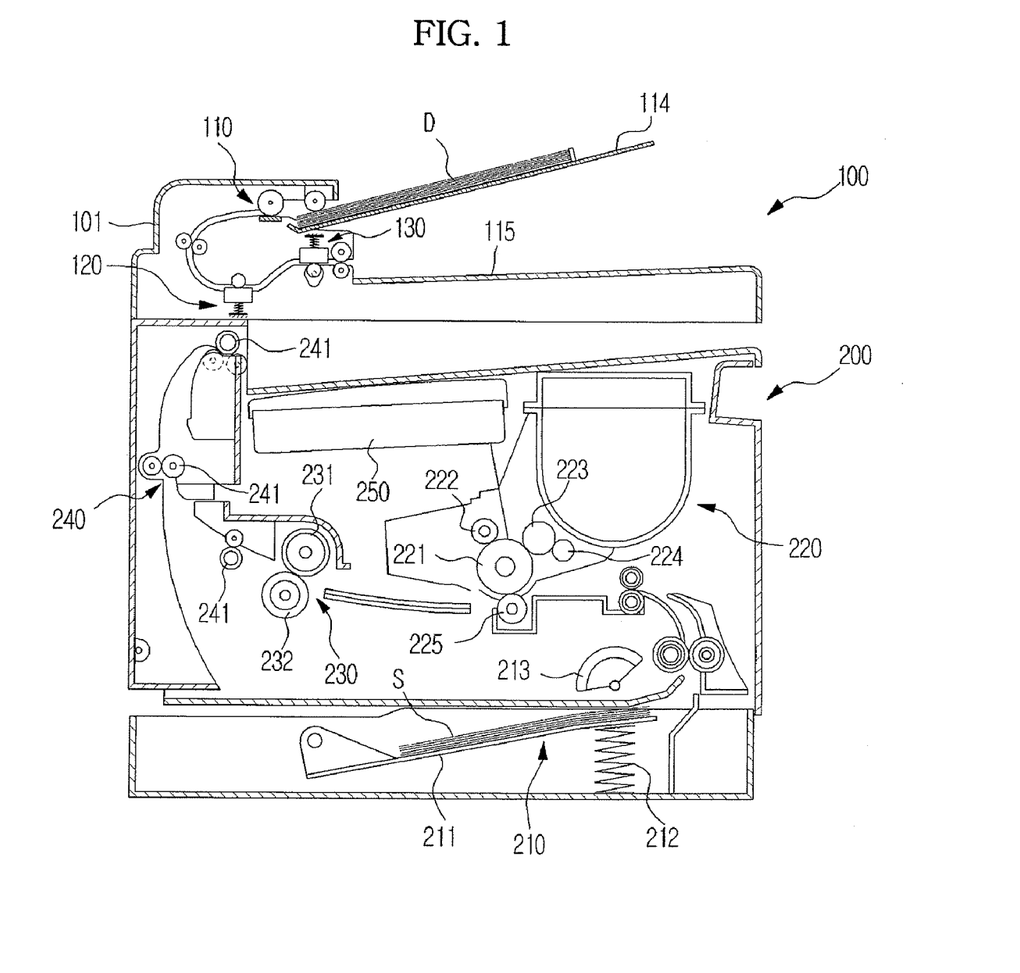
FIG. 1 is a view illustrating an image forming apparatus in accordance with an embodiment of the present general inventive concept.

FIG. 1 is a view illustrating an image forming apparatus according to an embodiment of the present general inventive concept.

As illustrated in FIG. 1, an image forming apparatus of an embodiment of the present general inventive concept includes an image reading device 100 to read image information recorded on a document, and a printing device 200 to print an image on a printing medium, e.g., paper. The image reading device 100 and the printing device 200 may be mounted in a frame (i.e., a main body 101) of the image forming apparatus.

The printing device 200 prints the image in response to a signal from the image reading device 100 or a signal from an external apparatus such as a computer, etc. The printing device 200 includes a printing medium feeding unit 210 to supply a printing medium, e.g., paper S, a developing unit 220 to develop the image on the paper, a fusing unit 230 to fuse the developed image to the paper by applying heat and pressure to the paper, and a printing medium discharge unit 240 to discharge the printed paper to the outside.

The printing medium feeding unit 210 includes a printing medium feeding tray 211 to load the paper S thereon, and a spring 212 to elastically support the printing medium feeding tray 211. The paper loaded on the printing medium feeding tray 211 is picked up by a pickup roller 213 sheet by sheet, and is fed toward the developing unit 220.

The developing unit 220 includes a photosensitive drum 221 on which an electrostatic latent image is formed by an exposure unit 250, a charge roller 222 to charge the photosensitive drum 221, a developing roller 223 to develop the electrostatic latent image formed on the photosensitive drum 221 into a toner image, a supply roller 224 to supply a toner to the developing roller 223, and a transfer roller 225 to press the paper toward the photosensitive drum 221 to transfer the toner image developed on the photosensitive drum 221 onto the paper.

The fusing unit 230 includes a heat roller 231 having a heat source to heat the toner image transferred onto the paper, and a press roller 232 disposed opposite to the heat roller 231 to maintain a constant fusing pressure with the heat roller 231.

The printing medium discharge unit 240 includes printing medium discharge rollers 241 which are sequentially mounted so as to discharge the paper having passed through the fusing unit 230 to the outside.

Figure 2:
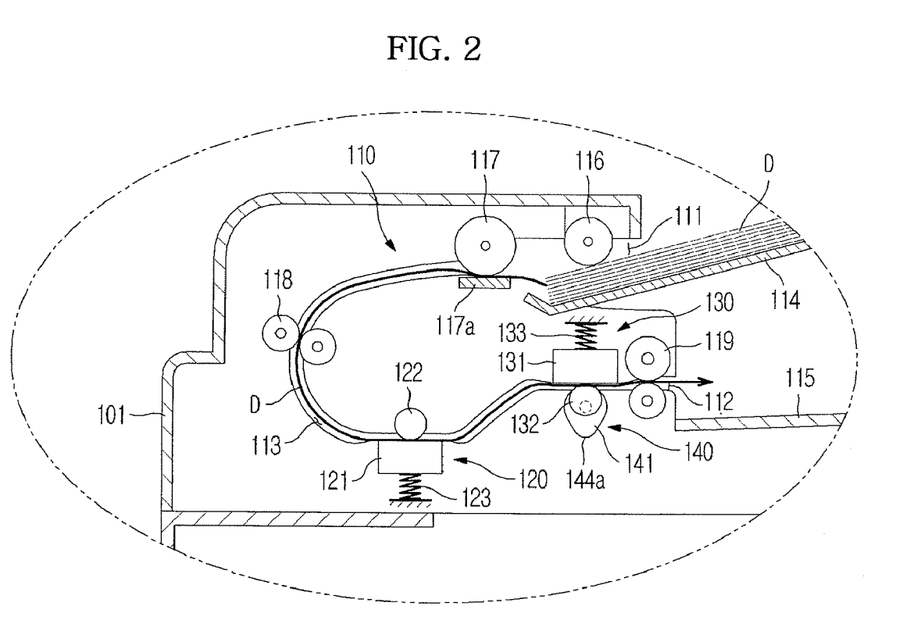
FIG. 2 is a view of a portion of an image reading device in accordance with an embodiment of the present general inventive concept when a second scan unit is located in a scan position.
Figure 3:
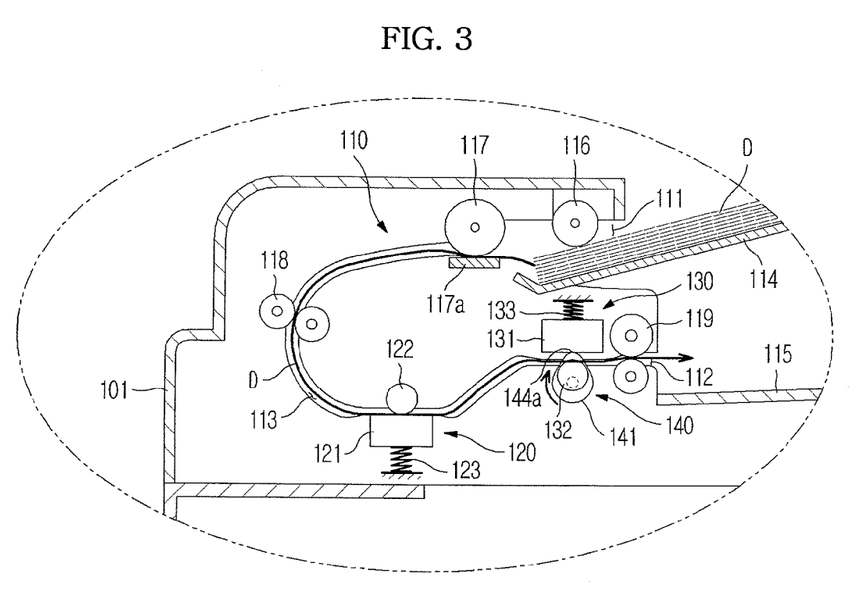
FIG. 3 is a view illustrating a state in which the second scan unit illustrated in FIG. 2 is located in a separated position.

FIGS. 2 and 3 are views of a portion of the image reading device according to an embodiment of the present general inventive concept. FIG. 2 illustrates a state in which a second scan unit is located in a scan position, and FIG. 3 illustrates a state in which the second scan unit is located in a separated position.

As illustrated in FIGS. 1 to 3, the image reading device 100 according to several embodiments of the present general inventive concept includes the main body 101 mounted with an automatic document feeding unit 110 to automatically feed the documents for successive scanning, and a first reading unit 120 and a second reading unit 130 to read image information from the document fed through the automatic document feeding unit 110.

The automatic document feeding unit 110 includes a document inlet port 111 through which the document to be scanned is supplied, a document outlet port 112 through which the scanned document is discharged, a document feeding path 113 which is formed in the main body 101 of the reading device to feed the document therethrough, and rollers which are mounted in the document feeding path 113 to feed the document.

The document inlet port 111 is formed at a portion of the main body 101, and the document outlet port 112 is formed below the document inlet port 111. A document feeding tray 114, on which the document D to be fed by the automatic document feeding unit 110 is loaded, is provided near the document inlet port 111, and a document discharge tray 115, on which the scanned document is discharged and loaded, is provided near the document outlet port 112.

The document feeding path 113 is formed in a substantially C shape. One end of the document feeding path 113 is connected to the document feeding tray 114 through the document inlet port 111, and an other end is connected to the document discharge tray 115 through the document outlet port 112.

The rollers, which are provided to feed the document, include a document pickup roller 116 to pick up the document D loaded on the document feeding tray 114, first and second feeding rollers 117 and 118 to feed the document picked up by the document pickup roller 116 in the document feeding path 113, and a discharge roller 119 to discharge the scanned document to the document discharge tray 115. The first feeding roller 117, which is positioned closest to the document pickup roller 116, functions to separate the document picked up by the document pickup roller 116 sheet by sheet. For this, a friction pad 117a is mounted opposite to the first feeding roller 117.

The first reading unit 120 and the second reading unit 130 are provided with a first scan unit 121 and a second scan unit 131, respectively, to read image information from the document fed through the document feeding path 113. In the simplex scanning operation, either the first scan unit 121 or the second scan unit 131 operates to scan only one surface of the document. In the duplex scanning operation, both the first scan unit 121 and the second scan unit 131 operate to scan both surfaces of the document in sequence.

The first scan unit 121 and the second scan unit 131 are arranged opposite to each other while interposing the document feeding path 113 therebetween. More particularly, the first scan unit 121 is disposed below the document D passing through the document feeding path 113 to read image information from a first surface of the document, and the second scan unit 131 is disposed above the document D passing through the document feeding path 113 to read image information from a second surface of the document. The first scan unit 121 and the second scan unit 131 irradiate light to the document, and detects the light reflected from the document.

By converting light intensity into an electric signal, the first and second scan units 121 and 131 read the image information from the document.

The first reading unit 120 includes a first press member 122 mounted while opposing the first scan unit 121, and a first elastic member 123 mounted opposite to the first press member 122 from the first scan unit 121 to elastically bias the first scan unit 121 toward the first press member 122. The first press member 122 and the first elastic member 123 make the document D pass by the first scan unit 121 while closely contacting the first scan unit 121 with a constant pressure, thereby improving a scan performance.

Figure 4:
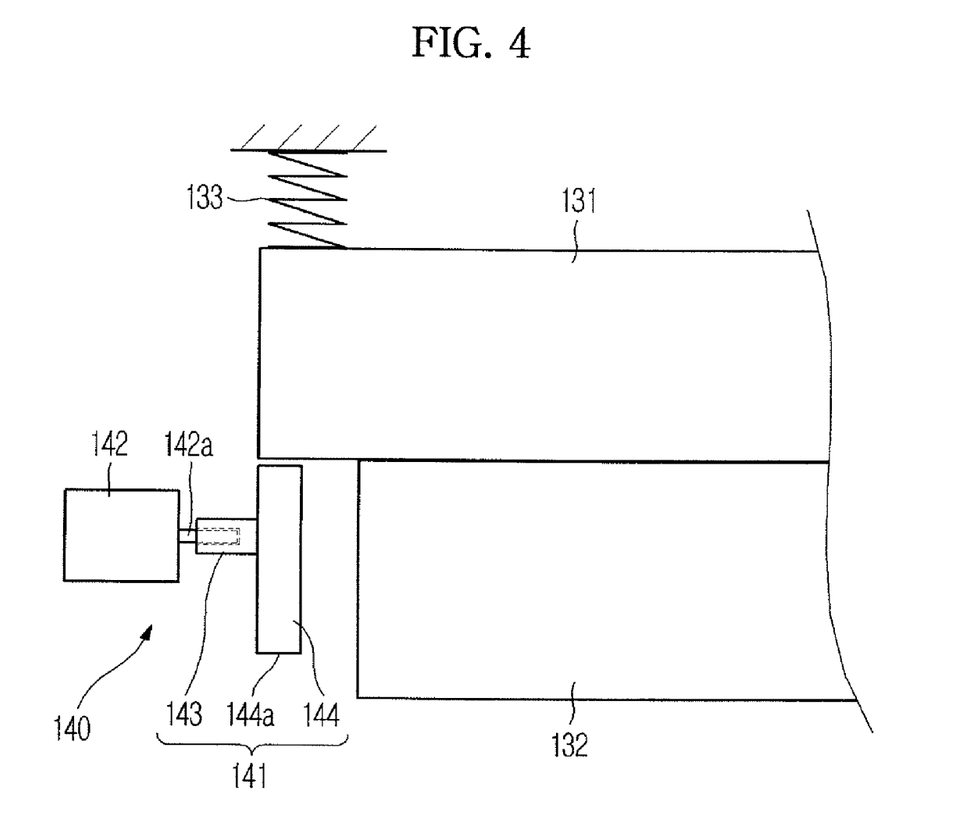
FIG. 4 is a front view illustrating a second reading unit and a lifting device of the image reading device illustrated in FIGS. 2 and 3.

FIG. 4 is a front view illustrating the constitution of the second reading unit and a lifting device of the image reading device illustrated in FIGS. 2 and 3. As illustrated in FIGS. 2 to 4, the second reading unit 130 includes a second press member 132 mounted while opposing the second scan unit 131 to closely contact the document D in the document feeding path 113 with the second scan unit 131, and a second elastic member 133 mounted opposite to the second press member 132 from the second scan unit 131 to elastically bias the second scan unit 131 toward the second press member 132. In this embodiment, the first press member 122 and the second press member 132 are configured as a roller such as a white roller, however the press members 122 and 132 may be configured as a press member of a pad or rod shape.

In this embodiment, the second scan unit 131 is mounted to so as to move between a scan position in which the second scan unit 131 closely contacts the document D passing through the document feeding path 113 to scan the second surface of the document (refer to the second scan unit in FIG. 2) and a separated position in which the second scan unit 131 is separated from the document D so that the document D can pass between the second scan unit 131 and the second press member 132 without being applied with an external force (refer to the second scan unit in FIG. 3). The reason to allow the second scan unit 131 to move to the separated position is to prevent the document from unnecessarily making friction with the second scan unit 131 and the second press member 132 when performing a simplex scanning operation using only the first scan unit 121.

The second scan unit 131 moves away from the second press member 132 by a lifting device 140. That is, the lifting device 140 moves the second scan unit 131 positioned in the scan position to the separated position. The lifting device 140 includes a cam member 141 to move the second scan unit 131, and a lifting motor 142 to rotate the cam member 141. FIG. 4 illustrates that the cam member 141 is directly connected to a rotating shaft 142a of the lifting motor 142. However, in another embodiment, a gear train for power transmission or a clutch device for power intermittence may be mounted between the lifting motor 142 and the cam member 141 as needed by the design.

The cam member 141 includes a cam shaft 143, and a rotating cam 144 provided at one end portion of the cam shaft 143. The cam member 141 is disposed opposite to the second elastic member 133 while interposing the second scan unit 131 therebetween. The rotating cam 144 has a protruding portion 144a to protrude in a radial direction from a rotational center. The rotating cam 144 rotates between a first position in which the rotating cam 144 is separated from the second scan unit 131 (refer to FIG. 2) and a second position in which the protruding portion 144a pushes up the second scan unit 131 (refer to FIG. 3).

If the protruding portion 144a of the rotating cam 144 presses the second scan unit 131 as the rotating cam 144 rotates, the second scan unit 131 moves from the scan position illustrated in FIG. 2 to the separated position illustrated in FIG. 3, and the second elastic member 133 is compressed. In such a state, if the rotating cam 144 rotates to separate the protruding portion 144a of the rotating cam 144 from the second scan unit 131, the second scan unit 131 returns to the scan position by an elastic force of the second elastic member 133. That is, the second elastic member 133 presses the second scan unit 131 so that the document can closely contact the second scan unit 131, and also returns the second scan unit 131 positioned in the separated position to the scan position.

In the present embodiment, when the second scan unit 131 is positioned in the scan position, an elastic force F2 of the second elastic member 133 pressing the second scan unit 131 is different from an elastic force F1 of the first elastic member 123 pressing the first scan unit 121. The elastic force F2 can be smaller than the elastic force F1, the first scan unit 121 can be fixedly mounted and the second scan unit 131 can be mounted movably between the scan position and the separated position. If the elastic force of the second elastic member 133 pressing the second scan unit 131 is strong, power consumption is large when the lifting device 140 moves the second scan unit 131 to the separated position. Accordingly, the second scan unit 131 and the second press member 132 may collide with each other and become damaged when the second scan unit 131 returns to the scan position by the elastic force of the second elastic member 133. Accordingly, setting the elastic force F2 to be smaller than the elastic force F1 within a range of avoiding deterioration of the scan performance is necessary. It is also possible that a first friction between the first press member 122 and the first scan unit 121 may be different from a second friction between the second press member 132 and the second scan unit 131. Here, the first friction may be constant, and the second friction may vary according to a movement of one of the second press member 132 and the second scan unit 131 with respect to the document scan path. The movement may include a first and second position to affect the second friction. The second friction may be zero when the second press member 132 and the second scan unit 131 are separated.

Hereinafter, the operation of the image reading device according to an embodiment of the present general inventive concept will be described with reference to FIGS. 2 and 3.

The duplex scanning operation will be described with reference to FIG. 2. If a duplex scan command is input, the cam member 141 of the lifting device 140 is positioned in the second position separated from the second scan unit 131, and thus the second scan unit 131 is positioned in the scan position. If the scan operation is started, the document is picked up by the document pickup roller 116, and the picked-up document is fed to the first reading unit 120 by the first feeding roller 117 and the second feeding roller 118. The document arriving at the first reading unit 120 passes between the first scan unit 121 and the first press member 122 while closely contacting the first scan unit 121, and the first surface of the document is scanned by the first scan unit 121. The document having passed through the first reading unit 120 is fed to the second reading unit 130. The document passes between the second scan unit 131 and the second press member 132 while closely contacting the second scan unit 131, and the second surface of the document is scanned by the second scan unit 131. Then, the duplex scanned document is discharged to the document discharge tray 115 by the discharge roller 119.

The simplex scanning operation will be described with reference to FIG. 3. If a simplex scan command is input, the cam member 141 of the lifting device 140 rotates at 180 degrees, and presses the second scan unit 131 to move the second scan unit 131 to the separated position. If the scanning operation is started, the document D is fed to the first reading unit 120 via the document pickup roller 116 and the first and second feeding rollers 117 and 118. The document arriving at the first reading unit 120 passes between the first scan unit 121 and the first press member 122 while closely contacting the first scan unit 121, and the first surface of the document is scanned by the first scan unit 121. The document having passed through the first reading unit 120 is fed to the second reading unit 130. Because the second scan unit 131 and the second press member 132 are in a state of being separated from each other, the document D does not make friction with the second scan unit 131 or the second press member 132, and is smoothly discharged to the document discharge tray 115 via the second reading unit 130. When the simplex scanning operation is terminated, the cam member 141 rotates at 180 degrees, and is restored to the state illustrated in FIG. 2. The second scan unit 131 returns to the scan position by the elastic force of the second elastic member 133.

Figure 5:
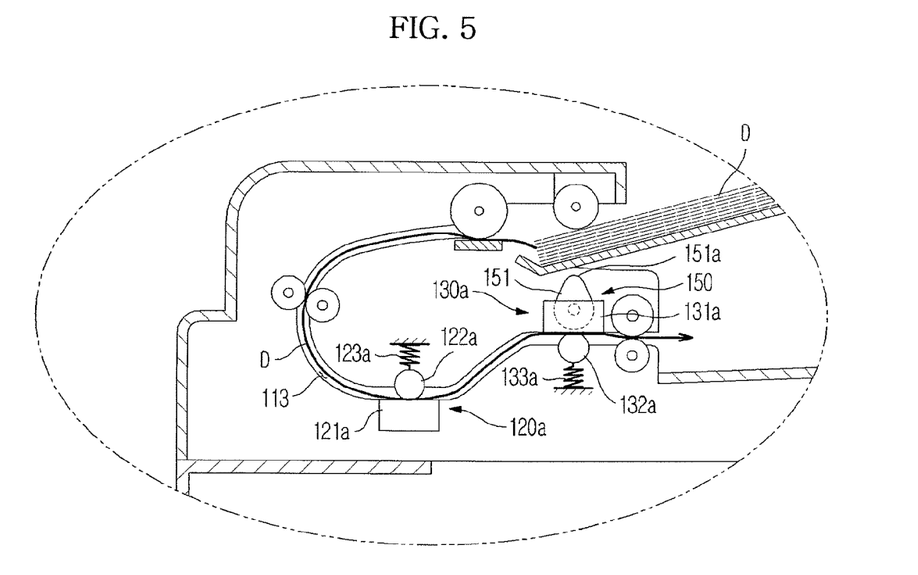
FIG. 5 is a view of a portion of an image reading device in accordance with an embodiment of the present general inventive concept when a second press member is located in a pressing position.
Figure 6:
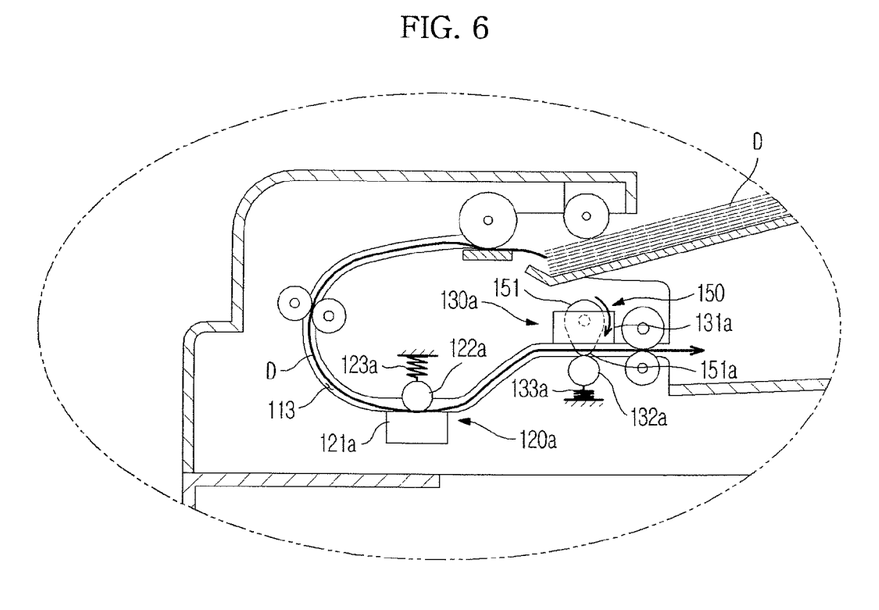
FIG. 6 is a view illustrating a state in which the second press member illustrated in FIG. 5 is located in a separated position.

FIGS. 5 and 6 are views of a portion of an image reading device according to an embodiment of the present general inventive concept. FIG. 5 illustrates a state in which a second press member 132a is located in a pressing position, and FIG. 6 illustrates a state in which the second press member 132a is located in a separated position. This embodiment is different from the previous embodiment illustrated in FIGS. 2 and 3 in that both a first scan unit and a second scan unit are fixedly mounted and a lifting device 150 moves the second press member 132a. Hereinafter, the constitutional or operational features of this embodiment, distinguished over the previous embodiment illustrated in FIGS. 2 and 3, will be described.

As illustrated in FIGS. 5 and 6, in this embodiment, a first reading unit 120a includes a first scan unit 121a to scan the first surface of the document, a first press member 122a mounted while opposing the first scan unit 121a to closely contact the document with the first scan unit 121a, and a first elastic member 123a to elastically bias the first press member 122a toward the first scan unit 121a. A second reading unit 130a includes a second scan unit 131a to scan the second surface of the document, a second press member 132a mounted while opposing the second scan unit 131a to closely contact the document with the second scan unit 131a, and a second elastic member 133a to elastically bias the second press member 132a toward the second scan unit 131a.

The second press member 132a is mounted movably between a pressing position in which the second press member 132a presses the document D passing through the document feeding path 113 to closely contact the second scan unit 131a (refer to FIG. 5) and a separated position in which the second press member 132a is spaced at a distance from the second scan unit 131a (refer to FIG. 6). In the duplex scanning operation, the second press member 132a is located in the pressing position, and the document is pressed by the elastic force of the second elastic member 133a, thereby securely achieving the scanning through the second scan unit 131a. Also in the simplex scanning operation, the second press member 132a is located in the separated position to widely open the document feeding path 113, thereby preventing the document D from unnecessarily making friction with the second scan unit 131a and the second press member 132a.

The second press member 132a moves from the pressing position to the separated position by a lifting device 150 having a cam member 151. The cam member 151 of the lifting device 150 is rotatably mounted opposite to the second elastic member 133a while interposing the second press member 132a therebetween. If a protruding portion 151a of the cam member 151 comes into contact with the second press member 132a as the cam member 151 rotates, the cam member 151 compresses the second elastic member 133a and presses down the second press member 132a. In such a state, if the cam member 151 rotates to separate the protruding portion 151a from the second press member 132a, the second press member 132a returns to the pressing position by the elastic force of the second elastic member 133a.

By the reason similar to that explained above with reference to FIGS. 2 and 3, the second press member 132a can be located in the pressing position, and the elastic force of the second elastic member 133a pressing the second press member 132a can be smaller than the elastic force of the first elastic member 123a pressing the first press member 122a.

Although it is illustrated in FIGS. 2, 3, 5 and 6 that the lifting device is configured to move the scan unit of the second reading unit or the press member, an additional lifting device may be mounted to move the scan unit of the first reading unit or the press member. In such a case, a user selects to use which one of the first reading unit and the second reading unit when intending to perform the simplex scanning job. According to the user's selection, the lifting device for the unselected reading unit operates to separate the scan unit and the press member from each other.

It is illustrated in FIGS. 2, 3, 5 and 6 that the first scan unit 121 (121a) is disposed below the document D passing through the document feeding path 113 and the second scan unit 131 (131a) is disposed above the document D passing through the document feeding path 113. It is also illustrated in FIGS. 2, 3, 5 and 6 that the first press member 122 (122a) opposes the first scan unit 121 (121a) and the second press member 132 (132a) opposes the second scan unit 131 (131a).

However, it is also possible to mount the scan units and the press members to the positions different from the above-described mounting positions. For example, the first scan unit 121 (121a) may be disposed above the document D passing through the document feeding path 113, and the first press member 122 (122a) may be disposed below the document feeding path 113 while opposing the first scan unit 121 (121a). The second scan unit 131 (131a) may be disposed below the document D passing through the document feeding path 113, and the second press member 132 (132a) may be disposed above the document feeding path 113 while opposing the second scan unit 131 (131a).

Figure 7:
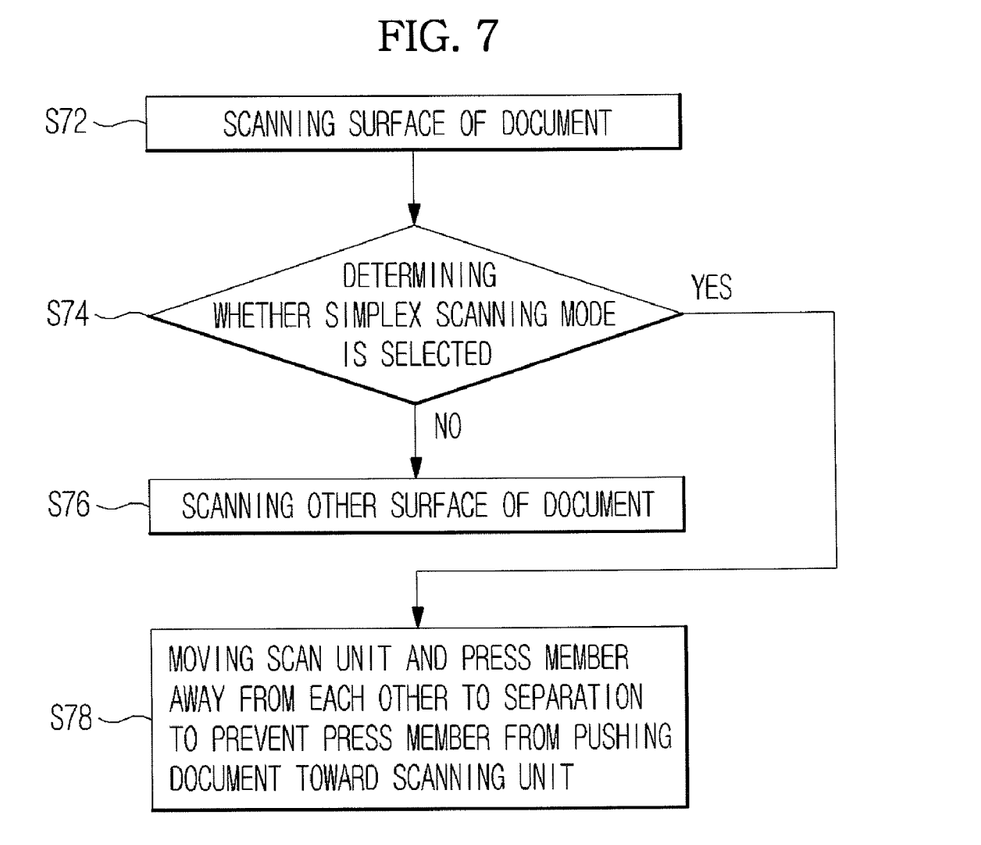
FIG. 7 is a flowchart illustrating an embodiment of a scanning method of an image forming apparatus.

FIG. 7 is a flowchart illustrating an embodiment of a scanning method of an image forming apparatus. Referring to FIG. 7, in operation S72, a surface of a document is scanned. In operation S74, whether a simplex scanning mode is selected is determined. In operation S76, if the simplex scanning mode is not selected, an other surface of the document is scanned. Otherwise, in operation S78, if the simplex scanning mode is selected, a scan unit and a press member are moved away from each other to a separation position to prevent the press member from pushing the document toward the scanning unit.

The present general inventive concept can also be embodied as computer-readable codes on a computer-readable medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

As apparent from the above description, the image reading device according to various embodiments of the present general inventive concept can prevent the document from unnecessarily making friction with other components which do not perform the scanning operation during the simplex scanning operation. Accordingly, unnecessary wear of components arranged in the document feeding path can be prevented, and thus the life of each component is lengthened. Further, the damage of the document during the scanning operation can be minimized, and the contamination of the components due to paper dust generated when the document makes friction with the scan unit or the press member can be minimized.

Although various embodiments of the present general inventive concept have been illustrated and described, it would be appreciated by those skilled in the art that changes may be made in these embodiments without departing from the principles and spirit of the general inventive concept, the scope of which is defined in the appended claims and their equivalents.

What is claimed is:

1. An image reading device, comprising:
   a first reading unit including a first scan unit to scan a first surface of a document, a first press member mounted while opposing the first scan unit, and a first elastic member to bias the first scan unit or the first press member to closely contact the document with the first scan unit; and
   a second reading unit including a second scan unit to scan a second surface of the document, a second press member mounted while opposing the second scan unit, and a second elastic member to bias the second scan unit or the second press member to closely contact the document with the second scan unit,
   wherein the first elastic member to bias the first scan unit or the first press member has an elastic force different from an elastic force of the second elastic member to bias the second scan unit or the second press member.

2. The image reading device according to claim 1, further comprising:
   a lifting device to move the second scan unit or the second press member to separate the second scan unit and the second press member from each other.

3. The image reading device according to claim 2, wherein the elastic force of the second elastic member is smaller than the elastic force of the first elastic member.

4. The image reading device according to claim 2, further comprising:
   a lifting device to move the first scan unit or the first press member to separate the first scan unit and the first press member from each other.

5. An image reading device, comprising:
   a first reading unit including a first scan unit to scan a first surface of a document;
   a second reading unit including a second scan unit to scan a second surface of the document, a press member mounted while opposing the second scan unit to closely contact the document with the second scan unit, an elastic member to elastically bias the second scan unit toward the press member, and a cam member disposed opposite the elastic member with the second scan unit therebetween to move the second scan unit to a separated vertical position; and
   a lifting device to move the second scan unit away from the press member.

6. The image reading device according to claim 5, wherein the first reading unit further comprises:
   a press member mounted while opposing the first scan unit to closely contact the document with the first scan unit; and
   an elastic member to elastically bias the first scan unit toward the press member of the first reading unit,
   wherein the elastic member of the first reading unit to bias the first scan unit has an elastic force different from an elastic force of the elastic member of the second reading unit to bias the second scan unit.

7. The image reading device according to claim 6, wherein the elastic force of the elastic member of the second reading unit to bias the second scan unit is smaller than the elastic force of the elastic member of the first reading unit to bias the first scan unit.

8. The image reading device according to claim 5, wherein the lifting device comprises:
   the cam member to rotate between a first position in which the cam member is separated from the second scan unit and a second position in which the cam member pushes up the second scan unit.

9. The image reading device according to claim 8, wherein when the cam member moves from the first position to the second position, the cam member compresses the elastic member, and
   when the cam member moves from the second position to the first position, the second scan unit returns to an original position by an elastic force of the elastic member.

10. An image reading device, comprising:
    a document feeding path to feed a document therethrough;
    a first scan unit to scan a first surface of the document;
    a second scan unit mounted movably between a first position in which the second scan unit closely contacts the document passing through the document feeding path to scan a second surface of the document and a second position in which the second scan unit is separated from the document passing through the document feeding path;
    a cam member to press one side of the second scan unit to move the second scan unit from the first position to the second position; and
    an elastic member to press an other side of the second scan unit to move the second scan unit from the second position to the first position.

11. An image reading device, comprising:
    a document feeding path to feed a document therethrough;
    a first scan unit to scan a first surface of the document;
    a second scan unit to scan a second surface of the document;
    a press member mounted movably between a first position in which the press member closely contacts the document passing through the document feeding path with the second scan unit and a second position in which the press member is separated from the document passing through the document feeding path;
    a cam member to press one side of the press member to move the press member from the first position to the second position; and an elastic member to press an other side of the press member to move the press member from the second position to the first position.

* * * * *